Dec. 23, 1952 V. FRESOLONE Re. 23,599

EMERGENCY FUEL SUPPLY DEVICE FOR MOTOR VEHICLES, BOATS, ETC

Original Filed May 14, 1948

INVENTOR
VITO FRESOLONE
BY Cornelius Zabriskie
ATTORNEY

Reissued Dec. 23, 1952

Re. 23,599

UNITED STATES PATENT OFFICE 23,599

EMERGENCY FUEL SUPPLY DEVICE FOR MOTOR VEHICLES, BOATS, ETC.

Vito Fresolone, Union, N. J.

Original No. 2,521,576, dated September 5, 1950, Serial No. 27,013, May 14, 1948. Application for reissue July 25, 1951, Serial No. 238,561

2 Claims. (Cl. 261—64)

Matter enclosed in heavy brackets [ ] appears in the original patent but forms no part of this reissue specification; matter printed in italics indicates the additions made by reissue.

This invention is an emergency fuel supply device for motor vehicles and is adapted to be used in the event that the fuel supply system for an internal combustion engine of an automobile, truck or the like becomes inoperative to supply fuel to the carburetor. This may occur through stoppage of the gasoline supply lines or for various other reasons. When this failure occurs in a car or truck passing along a highway, the motor becomes inoperative and it has heretofore been the practice for repairmen to make the repair along the highway or to tow the car into a service station where the repair can be made.

The object of the invention is to provide a simple and efficient device which may be carried in the car or truck or by a service man responding to an emergency call and which will permit of the attachment of such device in a simple and expeditious manner directly to the carburetor of the engine. When thus attached, it will feed an emergency supply of fuel to the engine and thus permit the car or truck to proceed upon its way, either to destination or to a service station where the needed repair may be made.

One feature of the present invention consists in the incorporation into my device of the fire protection means hereinafter more fully described.

Another important feature of this invention is the provision of means which will insure the feed of a proper mixture of fuel and air to the carburetor, so that it may pass therethrough to the engine in a condition to insure efficient engine operation.

Features of the invention, other than those adverted to, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 2:
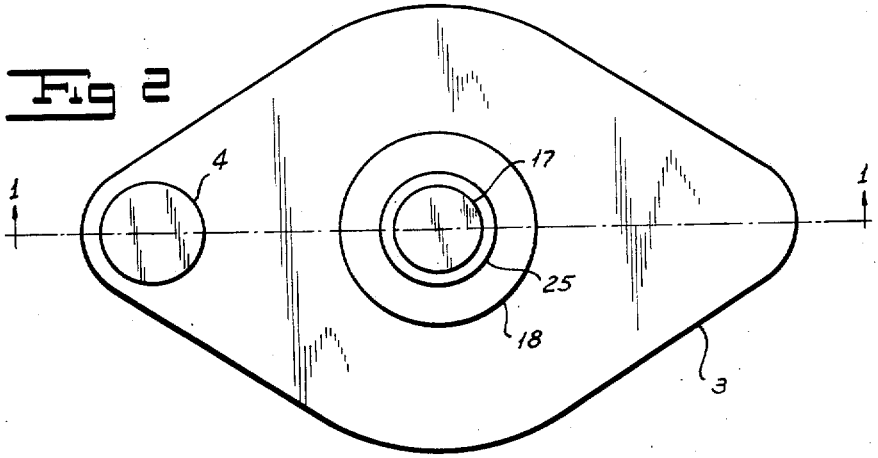
Figure 2 is a plan view of the structure shown in Figure 1.

Referring to the drawings, 1 designates an upright tube which may be referred to as the air tube. It is provided at its lower end with an appropriate coupler 2 whereby it may be attached to the inlet air passage of a down draft carburetor after the usual air filter has been removed from the latter. The coupling 2 may be of any desired type, but is preferably in the form of an adapter, so constituted as to fit any particular type of carburetor. Service mechanics may be supplied with different adaptors so as to be able to attach the tube 1 to the carburetor of any car which they are called upon to service. In any event, the coupling 2 mounts the air tube 1 rigidly in upstanding position upon a carburetor.

The tube 1 extends upwardly through substantially the center of an auxiliary supply tank 3 which may be of a size to contain one or two gallons of gasoline or other motive fuel. The tube 1 fits closely within the upper and lower walls of the tank and is fixedly secured thereto with leakproof joints, so as to mount the tank 3 upon the tube with the tube projecting above the top of the tank and below the bottom of the tank. Fuel may be introduced into the tank 3 through a filler plug 4.

Figure 3:
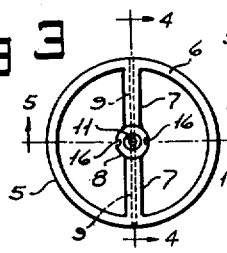
Figure 3 is a bottom plan view of a spider casting shown in section in Figure 1.
Figure 4:
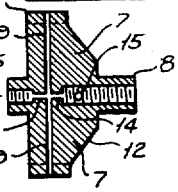
Figure 4 is a section taken on the line 4—4 of Figure 3.
Figure 5:
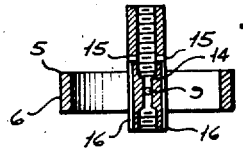
Figure 5 is a section on the line 5—5 of Figure 3.

Positioned within the tube 1 at about the level of the floor of the tank is a spider 5, shown in the form of a casting detailed in Figures 3, 4 and 5. This spider comprises an annular ring 6 tightly fitted into the tube 1 and sweated, welded or otherwise firmly secured in position therein. Extending inwardly from the ring are two integral arms 7 which support a central hub 8. This hub projects above and below the ring 6 of the spider, as shown best in Figure 5.

Figure 1:
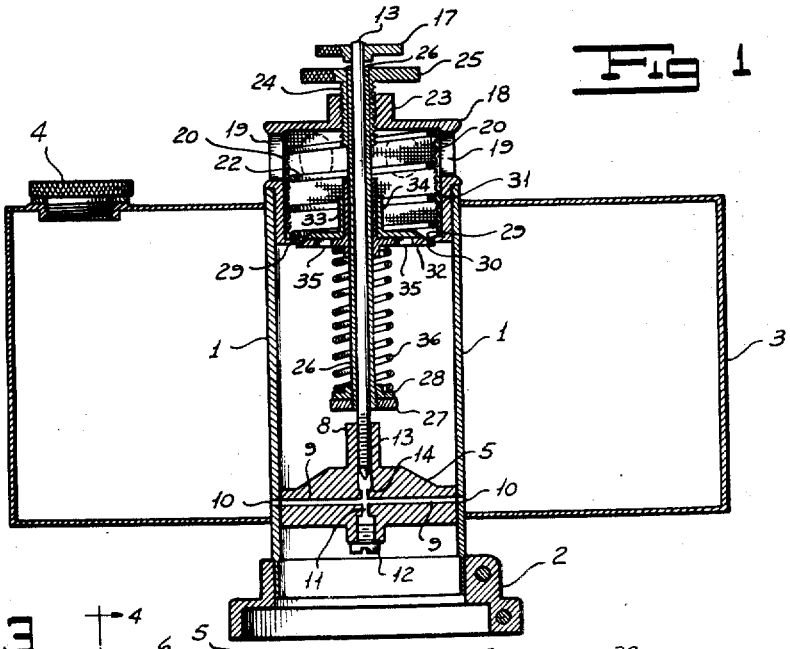
Figure 1 is a vertical central section through a device embodying the present invention, said section being taken on the line 1—1 of Figure 2.

The spider is provided therein with an auxiliary supply passage 9 extending diametrically from opposite sides of the ring 6 through the arms 7 and registering with perforations 10 formed in the air tube 1, as shown best in Figure 1, so that gasoline from the tank 3 is freely admitted through the perforations 10 into the gasoline supply passage 9. Intersecting with the passage 9 is a passage 11 which extends axially of the hub. The lower end of this passage 11 is counterbored and threaded to receive a closure plug 12, while the upper portion of the passage 11 is counterbored and threaded to receive a valve stem 13 above a conical valve seat 14 formed in the upper end of the passage 11 at the bottom of the threaded counterbore. Spaced above the valve seat 14 are outlet ducts 15 which pass entirely through the hub 8 to the outer surface thereof and from these ducts 15, channels 16 extend downwardly along the outer surface of the hub to the bottom thereof, as shown best in Figure 5. When the valve stem is raised from its seat, gasoline may flow from the perforations 10 into and through the passage 9, upwardly past the valve seat 14 and out through the ducts 15, to flow downwardly through the channels 16.

The valve stem 13 threads into the upper threaded counterbore of the spider hub and is cone-shaped at its lower end after the manner of a needle valve. This valve stem extends upwardly to a point appreciably above the top of the tank and carries a hand wheel 17 whereby the valve may be adjusted with respect to its seat 14.

Seated in the upper open end of the air tube 1 is a cage 18. This cage may be in the form of a stamping or casting. It is of a size and shape so that its lower portion fits closely into the upper end of the tube wherein it is threaded, sweated or welded in place. The upper portion of the cage above the top of the tube is provided with a series of circumferentially disposed openings 19, shown as circular and six in number. These openings are for the intake of air, but to preclude flame from passing outwardly through said openings in the event of back fire, as hereinafter explained, the lateral wall of the cage is preferably lined with a fine wire mesh in the form of a cylindrical mesh screen 20 which may be conveniently held in position by a few convolutions of spring wire indicated at 22.

The cage 18 is provided at its top with a coaxial boss 23, interiorly threaded to receive the threaded hub 24 of a hand wheel 25. This hand wheel and its hub are rigidly affixed to the upper end of a sleeve 26 which embraces the needle valve stem 13 and extends downwardly to a point somewhat above the upper end of the hub 8 of the spider and secured to the lower end of this sleeve is a retaining nut 27 which supports above it a spring retainer 28. By rotation of the hand wheel 25, the spring retainer may be raised or lowered for reasons presently explained.

Figure 6:
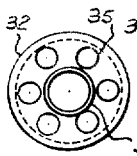
Figure 6 is an underneath plan view of the lower air inlet valve shown in Figure 1, showing said valve detached.
Figure 7:
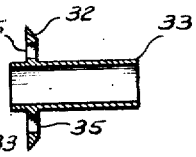
Figure 7 is a central section of that valve detached.

The bottom wall of the cage is cut away to form a rather large annular valve seat 29 with which an air inlet valve 30 is adapted to cooperate. This air inlet valve is composed of two sections, namely, an upper section 31 and a lower section 32. The lower section 32 has a tubular hub 33 adapted for sliding movement on the sleeve 26, while the upper section 31 has a tubular hub 34 adapted for sliding movement on the hub 33 of the lower section. The lower section 32 has a frusto conical outer edge adapted to cooperate with the valve seat 29 and inwardly from said outer edge, said lower section is provided with a series of openings 35 extending entirely through the lower section, as shown best in Figures 1, 6 and 7. The upper section 31 of the valve is somewhat smaller than the lower section, i. e., it is of less size than the port opening within the valve seat 29, but nevertheless is of sufficient size to normally cover and seal the openings 35 in the lower section.

Under normal conditions, the upper section gravitates into engagement with the upper surface of the lower section and serves to seal the openings 35, while a spring 36 is interposed between the lower section 32 and the spring retainer 28 and applies its compression force to normally maintain the lower section 32 in engagement with the seat 29. The amount of pressure exerted by this spring against the lower section may be readily adjusted by rotating the adjusting wheel 25, so as to raise or lower the spring retainer 28.

The device of this invention functions in the following manner:

When the engine of a car ceases to function properly and it is apparent that its failure to operate is due to the lack of feed of fuel to the carburetor, the air filter normally attached to the air inlet of the present day down draft carburetor is removed and the device of this invention is substituted in its place, the tank 3 having been previously filled with gasoline or other motive fuel. At this time the needle valve of the valve stem 13 is seated to seal the fuel in the tank 3 and the tension of the spring 36 has been adjusted, by rotation of the handle 25, so that the compression of this spring is sufficient to normally maintain the lower section 32 of the air valve in engagement with the seat 29, but insufficient to overcome the action of suction within the engine of the car to overcome the compression of this spring and draw the valve section 32 away from said seat. After the device has thus been mounted on the carburetor, the needle valve is raised from its seat by rotating the hand wheel 17. This will allow gasoline or other motive fuel in the tank 3 to be fed from the tank through the perforations 10, passage 9 and passage 14 whence it passes outwardly through the ducts 15 and starts to flow down through the channels 16.

If the starter of the car is then operated to "turn over" the engine, suction will be communicated from the cylinders through the carburetor into the air tube 1 and this suction will be sufficient to lower both valve sections 31 and 32 together so that atmospheric air is drawn in through the openings 19 and downwardly through the air tube 1 into the carburetor and hence through the intake manifold to the cylinders of the engine.

During its operation, the passage of the air through the air tube 1 is accomplished with such high velocity that it picks up the gasoline flowing through the channels 16 and breaks it up or divides it into a fine spray, so that it is carried along in this condition to and through the carburetor to the cylinders. The proper mixture of gasoline and air may be very accurately regulated by adjusting the needle valve to supply the amount of fuel and likewise adjusting the spring to control the opening of the air valve 30. In this way a mixture of air and fuel of high efficiency may be obtained as the mixture passes into the carburetor and thus a smooth and economically operating engine is assured, even when the engine is running on the emergency supply fuel from the tank 3. This is made possible because of the ability to properly meter both the fuel and air supplied from the auxiliary tank.

Should a back fire occur, the lower section 32 of the air valve 30 will immediately be forced to its seat 29, but the pressure of such back fire within the air tube 1 below this valve will act through the openings 35 to lift the upper section 31 and thus permit the back fire pressure to escape through the openings 19 without damage to the device. Meanwhile the screen 20 will function to preclude the exit of flame through the openings 19 and consequently protect those portions of the car beneath the hood from ignition. As soon as the back fire ceases, the device is ready to go to work again in the fulfillment of its functions and the cause of such back fire may be quickly remedied, if due to "lean mixture."

by proper regulation of gasoline and air supply as hereinbefore described.

Through the use of the present invention, a motor vehicle, incapacitated by clogged fuel lines, may be expeditiously equipped with the emergency device which I have described, to permit it to proceed on its way as long as the fuel in the tank will permit and this supply may be replenished from time to time through the filling opening 4. The device of this invention is highly efficient in the carrying out of its intended purposes and it is perfectly safe to use.

The foregoing detailed description sets forth the invention in its preferred practical form, but the invention is to be understood as commensurate with the appended claims.

Having thus fully described the invention, what I claim as new and desire to secure by Letters Patent is:

1. An emergency fuel supply device for motor vehicles comprising: a fuel storage tank separate and apart from the tank of the carburetor of the vehicle, an air inlet tube extending vertically through the tank from a point above the same, means to detachably secure said tube at its lower end to the air inlet of said conventional carburetor, the top of said tube having a closure provided with air inlets screened with wire mesh, an air inlet valve seat below the closure, an air inlet valve within said tube below said seat and embodying two sections the lower of which is adapted to upwardly seat against the air inlet valve seat and is provided with openings and the upper of which sections normally rests by gravity upon the lower section to cover said openings, a sleeve extending downwardly through the closure and air inlet valve and carrying a spring retainer within the tube, a compression spring interposed between said spring retainer and the air inlet valve to normally seat the lower section of the latter, said sleeve being vertically adjustable to regulate the compression of the spring, a needle valve seat positioned in the lower end of the air tube in a fuel duct leading from the interior of the fuel tank and discharging into the interior of the air tube, and a needle valve cooperating with said needle valve seat and having a valve stem extending upwardly through said sleeve to a point above the closure and vertically adjustable to regulate the flow of fuel through said duct.

*2. An emergency fuel supply device for motor vehicles comprising a fuel storage tank separate and apart from the tank of the carburetor of the vehicle, an air inlet tube extending vertically through the tank and adapted to be detachably secured at its lower end to the air inlet of said carburetor, a supporting structure fastened in a lower part of the air tube and having a passage from the bottom of the tank to an outlet orifice fixed in position to deliver fuel to the air stream flowing through the air tube, a fuel valve seat in fixed position in said passage and a threaded bore immediately above said seat and integral therewith, a fuel valve stem threaded in said bore and having a fuel valve at its lower end and extending upward through said air tube for manipulation at the top thereof, the upper end of said tube being formed with a chamber surrounding said stem and bounded above by a horizontal top with a depending cylindrical skirt and at the bottom by an inwardly directed annulus having a central air valve orifice and a spring-supported air valve cooperating therewith and slidingly surrounding said fuel valve stem to move downward under increased vacuum and to automatically snap upward upon increased back pressure due to occurrence of a back fire in the supply stream below said valve and without affecting the setting of said fuel valve relative to its seat.*

VITO FRESOLONE.

REFERENCES CITED

The following references are of record in the file of this patent:

UNITED STATES PATENTS

| Number | Name | Date |
|---|---|---|
| 829,345 | Menns | Aug. 21, 1906 |
| 993,516 | Gentle | May 30, 1911 |
| 997,417 | Rothe | July 11, 1911 |
| 1,246,305 | Mundhenk | Nov. 13, 1917 |
| 1,263,570 | Chappelle et al. | Apr. 23, 1918 |
| 1,573,065 | Hess | Feb. 16, 1926 |
| 2,389,685 | Pike | Nov. 27, 1945 |
| 2,485,701 | Cristofani et al. | Oct. 25, 1949 |
| 2,512,225 | Derner | June 20, 1950 |